UNITED STATES PATENT OFFICE.

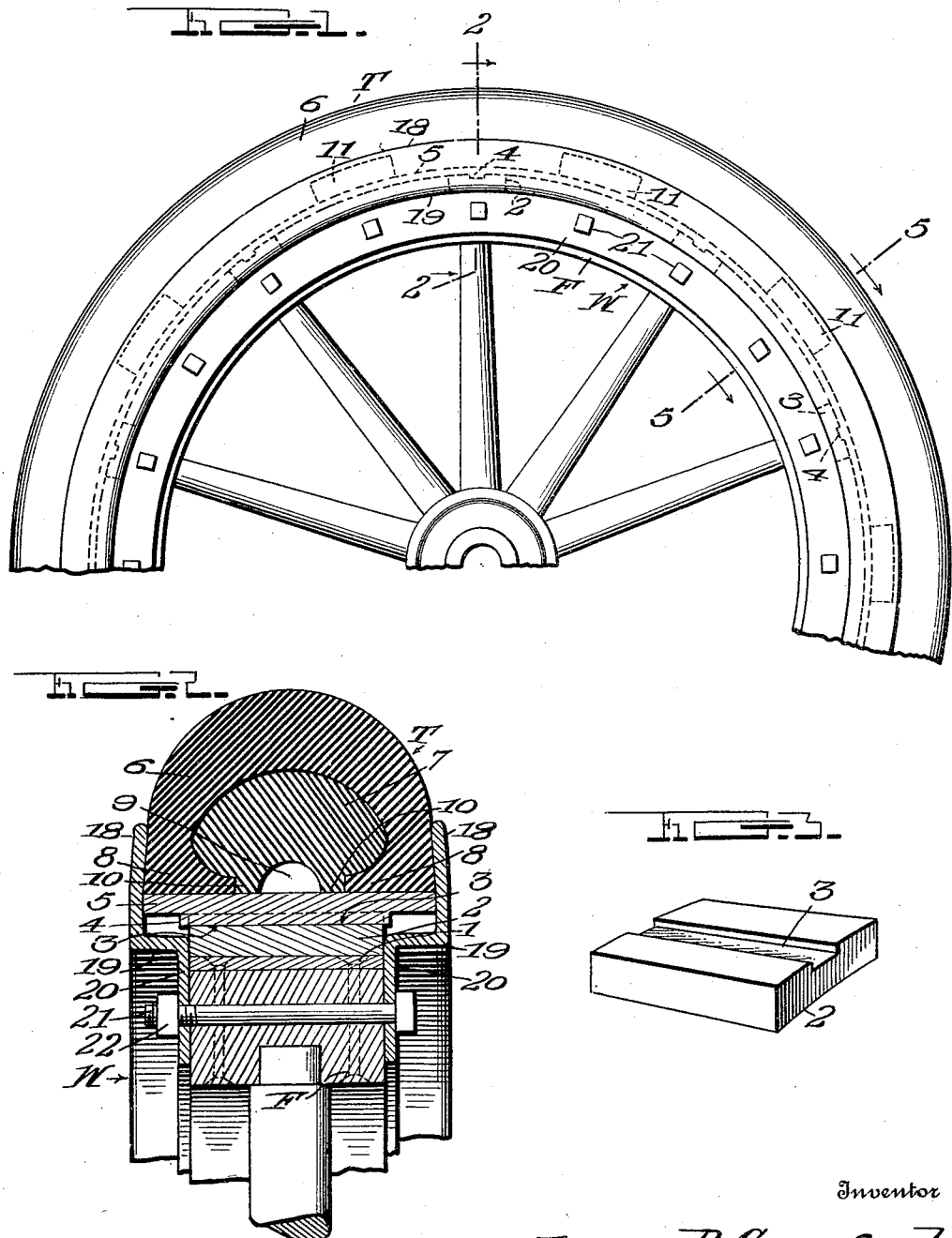

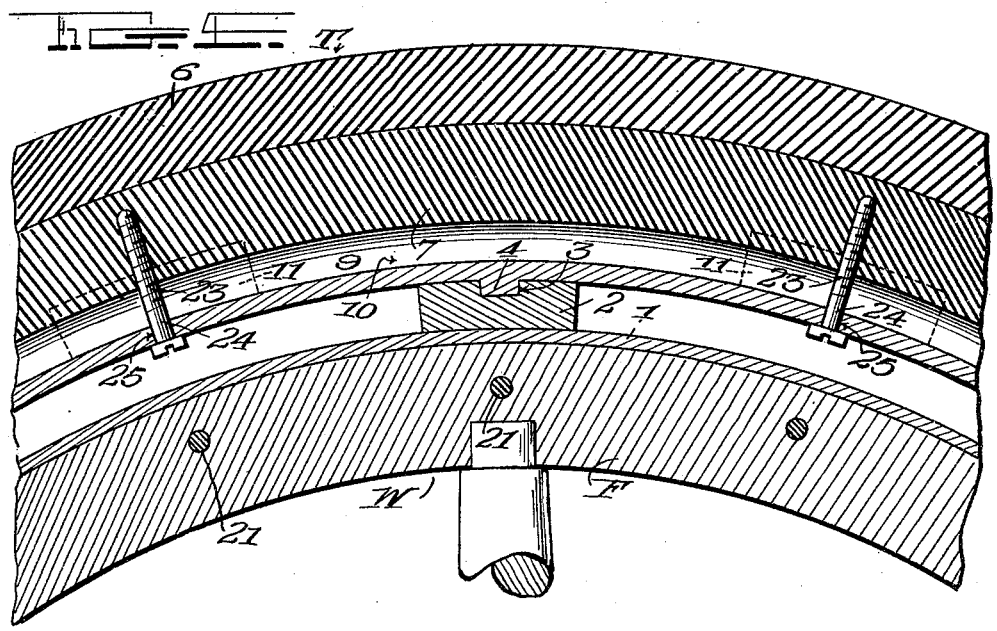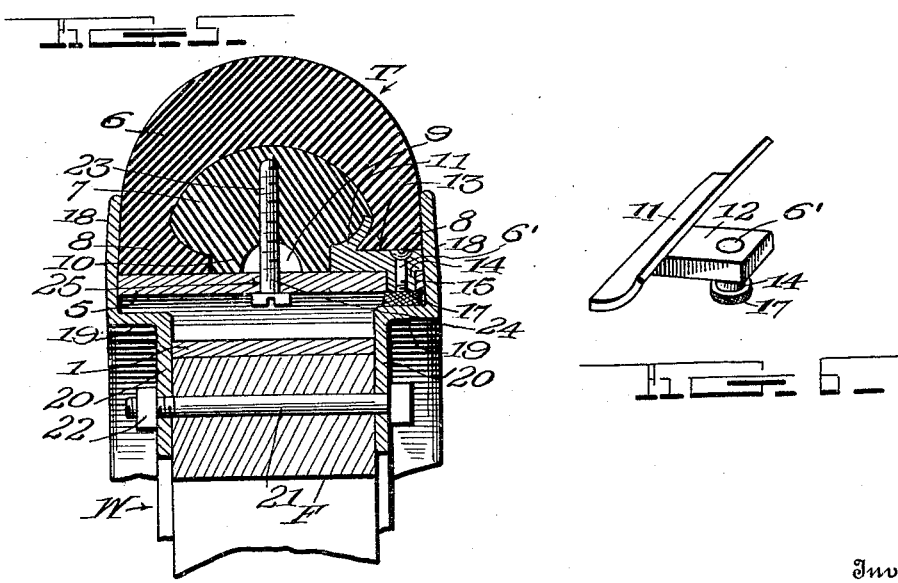

JAMES B. CRAWFORD, OF SIOUX CITY, IOWA, ASSIGNOR TO CRAWFORD WHEEL AND TIRE COMPANY, A CORPORATION OF IOWA.

AUTOMOBILE RIM AND TIRE.

1,121,483.     Specification of Letters Patent.     Patented Dec. 15, 1914.

Application filed May 14, 1914. Serial No. 838,569.

*To all whom it may concern:*

Be it known that I, JAMES B. CRAWFORD, a citizen of the United States, residing at Sioux City, in the county of Woodbury and State of Iowa, have invented certain new and useful Improvements in Automobile Rims and Tires; and I do declare the following to be a full, clear, and exact description of the invention, such as will enable others skilled in the art to which it appertains to make and use the same.

This invention relates to improvements in rims and tires for automobiles and the primary object of the same is to provide simple and efficient means whereby the tire is secured on the rim and whereby any radial or lateral thrust exerted by the filler, employed in the tire, is taken by a plurality of clamping plates disposed within the tire, thus preventing the same from being forced laterally into binding contact with the flanges of the rim.

A secondary object is to provide means whereby the elements which secure said clamping plates to the rim are protected against loosening, as well as against mud and the like.

With the above objects in view, the invention resides in certain novel features of construction and combination herein described and claimed and shown in the drawings, wherein:

Figure 1 is a side elevation of a portion of a wheel constructed in accordance with my invention; Fig. 2 is a transverse section thereof on line 2—2 of Fig. 1; Fig. 3 is a detail perspective view of one of the bearing blocks; Fig. 4 is a longitudinal section through a portion of the rim and tire; Fig. 5 is a transverse section on the line 5—5 of Fig. 1; and Fig. 6 is a detail perspective view of one of the clamping plates.

In the accompanying drawings, I have shown a wheel W which may be of the usual or any desirable construction, so long as its felly F is of such construction as to allow its periphery to lie parallel to its axis. The periphery of said felly F is surrounded by a snugly fitting metal band 1 which carries a plurality of integral spacing blocks 2 which are disposed at suitable intervals around its periphery.

Each spacing block 2 is provided with a transverse channel or key way 3 in its outer face in which keys 4 carried by the inner side of a rim 5 are adapted to slide for the purpose of preventing said rim from creeping upon the felly F, it being understood that the felly band 1 is rigidly secured to said felly. As clearly shown in the drawings, the rim 5 is of greater width than the felly, felly band and the bearing blocks and projects equi-distantly beyond the opposite sides of said elements, this provision being made for the purpose of securing a wider area on which the tire T is adapted to rest.

The tire T comprises a casing 6 which is arch-shaped in cross section and a resilient filler 7. The casing 6 is provided with annular rim engaging flanges 8 which extend from its opposite sides into its interior and as shown, are preferably curved outwardly from their inner sides to the points where they unite with the sides of the casing 6. The filler 7 is formed of any suitable resilient material such as rubber and is provided with an annular groove 9 on its inner side, the positioning of said groove thus providing bearing rings 10 which are the only points of contact of the filler with the rim. As clearly shown in the cross sectional views, the filler 7 when in position, fits snugly against all interior surfaces of the casing 6.

Disposed at suitable intervals around the circumference of one or both of the flanges 8, is a plurality of clamping plates 11 which overlie the curved outer surfaces of said rim engaging flanges 8 and are curved transversely and longitudinally to conform to the contour of said flanges. Each clamping plate 11 is provided with a laterally extending foot 12 which projects into a notch 13, the latter being disposed at suitable intervals.

The feet 12 are provided with radially extending bosses or projections 14 which fit snugly into openings 15 formed through the laterally extending sides of the rim 5, clamping bolts 6' being passed through said feet and their bosses and receiving clamping nuts 17 which are of greater size than the openings 15 and which therefore engage the inner side of the rim 5 and prevent any movement whatever on the part of the clamping plates 11.

In order to retain the casing 6 upon the rim, I provide clamping flanges 18 which fit snugly against the opposite sides of said casing at their outer edges, while their intermediate portions are extended inwardly as at 19 and here contact with the nuts 17, their inner portions 20 contacting with the opposite sides of the felly F, felly band 1, and bearing blocks 2 and being secured in position by bolts 21 which pass through said felly and receive nuts 22. By this positioning of the clamping rings 18, the tire, its rim, and the bearing blocks 2 are effectually secured in position and by the engagement of said clamping plates with the nuts 17, said nuts are locked against rotation, as well as shielded from mud, snow and ice and the like.

By the specific construction and positioning of the clamping plates 11, the casing 6 is effectually prevented from creeping upon the rim and any radial or lateral thrust exerted by compression of the resilient filler 7 will be received by said clamping plates and thus the side walls of the casing 6 are prevented from being forced outwardly into binding contact with the rings 18. This I consider a very important feature of the invention, since it is obvious that excessive wear on the sides of said casing will be eliminated.

In addition to mounting the casing 6 in such a manner as to prevent it from creeping upon the rim 5, it is also expedient to provide means whereby the filler 7 is secured against movement within said casing. For this purpose, I provide a plurality of screws 23 whose free ends are rather coarsely threaded, while their shanks 24 are slidable within openings 25 which communicate through the rim 5, with the groove 16 and the space between certain of the bearing blocks and the rim and felly band, said threaded portions being screwed into said filler. By passing the shank 24 of the screws 23 loosely through the openings 25, when the filler 7 yields under the weight of the load supported thereby, said shanks will be allowed to move radially through said openings and will by no means retard the compression of said filler.

When it is desired to remove the tire T for any purpose, one or both of the clamping plates 18 may be removed whereupon the sides of the casing may be readily swung outward, thus giving access to the clamping plates 11 for the purpose of removing them, and also exposing the nuts 17. If it is desired to remove the entire rim and tire, said rim may be moved laterally whereupon its keys 4 will disengage the key ways 3 in the bearing blocks 2.

From the foregoing description, taken in connection with the accompanying drawings, it will be seen that I have produced a simple and efficient means for performing the functions set forth herein and have also provided effectual means for preventing the removal of the clamping plates and for guarding them.

Although I have described my invention with considerable minuteness, I do not wish to be limited to details other than those amplified in the appended claims.

Having thus described my invention, what I claim as new and desire to secure by Letters Patent is:

1. In a device of the character described, a rim having an opening near one edge, annular flanges projecting beyond the periphery of said rim on its opposite edges, an arched tire on said rim between said flanges, a rim engaging flange extending from one side of said tire into its interior, said flange and a portion of the adjacent side of said tire being notched on their inner sides, a clamping plate overlying said rim engaging flange, a base projecting laterally from said clamping plate into said notch, a projection on said base and passing into the opening in said rim, a bolt passing through said base and said projection and a nut on said bolt and of greater size than said opening.

2. In a device of the character described, a rim, annular flanges projecting beyond the periphery thereof on its opposite edges, an arched tire on said rim and contacting with said flanges, a rim engaging flange projecting from one side of said tire into its interior, the portion of said flange and the tire, contacting with the rim, being notched at intervals, longitudinally and transversely curved clamping plates overlying said rim engaging flange, bases projecting laterally outward from said plates through said notches, and fastening elements uniting said bases with the rim.

In testimony whereof I have hereunto set my hand in presence of two subscribing witnesses.

JAMES B. CRAWFORD.

Witnesses:
WM. R. TOWNS,
VICTOR BROWN.